Feb. 3, 1931.    M. WILDERMAN    1,791,437
MANUFACTURE OF POROUS EBONITE BODIES
Original Filed April 22, 1922
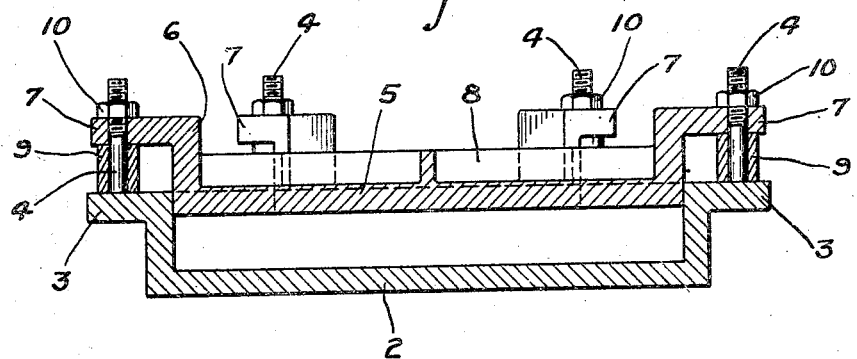
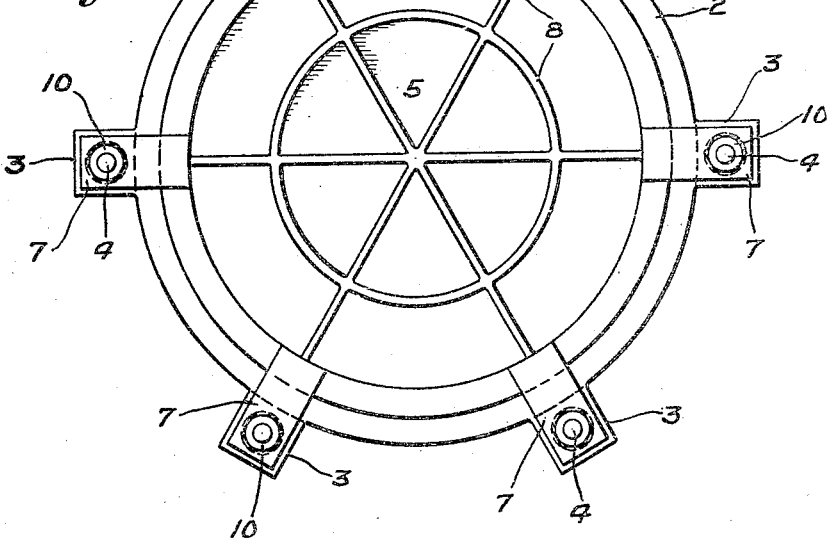
INVENTOR
Meyer Wilderman Patented Feb. 3, 1931

1,791,437

UNITED STATES PATENT OFFICE

MEYER WILDERMAN, OF LONDON, ENGLAND, ASSIGNOR, BY MESNE ASSIGNMENTS, TO THE AMERICAN WILDERMAN POROUS EBONITE COMPANY, INC., OF PHILADELPHIA, PENNSYLVANIA, A CORPORATION OF PENNSYLVANIA

MANUFACTURE OF POROUS EBONITE BODIES

Original application filed April 22, 1922, Serial No. 556,088, and in France March 15, 1922. Divided and this application filed October 11, 1927. Serial No. 225,569.

This invention relates to the production of porous bodies such as diaphragms, filters or the like, from ebonite. It is a division of my copending application Serial No. 556,088, filed April 22nd, 1922, which matured into Patent No. 1,651,567, granted December 6, 1927.

Various materials have been proposed for the construction of diaphragms or filters. For example, it has been proposed to use nitrocloth, cement, ceramic materials, asbestos, and various other substances. Such diaphragms are open to numerous objections. Many of them will not withstand the action of alkalies, acids or chlorine. Many of them are lacking in the desired physical qualities and are likely to become soft in water, or to swell and lose their mechanical strength. Others become brittle and lose their strength in this way. Others cannot be made to the desired shape, or cannot be produced straight enough to form large surfaces. Many of them present great difficulties in manufacture and are of such character that they cannot be reinforced with a metal, particularly an insulated metal. Such diaphragms are also undesirable in that their porosities can be varied only within comparatively narrow limits. This restricts the field of useful application of the different diaphragms.

In my Patent No. 1,651,567 above referred to, there is disclosed a process of making diaphragms from ebonite by bringing ebonite particles whose surface portions at least are only partially cured, into such volume that the particles are in contact, but have interstitial spaces, and vulcanizing the mass. The diaphragm thus produced is mechanically strong, will retain its shape and strength under extremely adverse conditions, may be manufactured at relatively low cost, may be readily reinforced with metal and may be made of any desired porosity, so that its percolation rate may be varied under a wide range.

The present application relates to a modified process wherein ebonite particles are coated with a rubber compound capable of being cured into ebonite, are then brought into such volume as will cause the adjacent particles to contact and combine, but will not compact them into a non-porous mass, and are then vulcanized into an integral body.

As these porous bodies may be made of any desired thickness, size and shape, of any desired porosity and percolation properties, and since the ebonite adheres to iron and other metals as well as to metals which are partially or entirely covered with ebonite, it will be seen that their field of application is very great, and that they may be used under widely varying conditions. It is possible, for example, to use very porous diaphragms of great percolation properties as supports for other diaphragms or filtering materials, such as sand, barium sulphate, flocks of asbestos, etc. In the latter case, the asbestos takes up all the impurities while the ebonite diaphragm permits of using the filter for a longer time. If desired, the ebonite body can be so shaped as to contain the other filtering material. The diaphragms also can be so constructed that their surfaces are especially suited for the reception of other finely divided substances, such as barium sulphate, Portland cement, colloids, etc. In this way it is possible to fill up the capillaries only in the uppermost diaphragm layer with such substances, while the rest of the diaphragm retains its original high porosity and small electric resistance. In this way, diaphragms having a very small speed of percolation can be obtained. An example of this is as follows:—

A diaphragm seven millimeters thick was prepared from fine powder, the powder consisting of vulcanized hard ebonite particles covered with a very thin layer of non-vulcanized ebonite. The diaphragm had a porosity of 43% and an absolute coefficient of percolation (water at 13° C.) K=0.206. A paste of fine natural barium sulphate was prepared and rubbed into the pores of the top surface of the diaphragm with a piece of cloth. This reduced the absolute coefficient of percolation very greatly, K having become equal to 0.0001907.

In the accompanying drawings which illustrate an apparatus for making circular diaphragms, Figure 1 is a sectional view of a mold, and Figure 2 is a plan view thereof.

In the drawings there is shown a mold having a body portion 2 with edge flanges 3 thereon. Bolts 4 project from the flange. A cover portion 5 fits into the mold 2. This cover has sides 6 with flanges 7 formed thereon. These flanges have holes to receive the bolts 4. The cover is shown as being reinforced with ribs 8.

In making a porous diaphragm in the mold, a quantity of hard rubber particles is coated with raw rubber so that there is a thin layer of vulcanizable material over the surface of the particles. The quantity of powder used is such that if it were compressed to a solid non-porous mass having no interstices, it would form a layer in the mold of considerably less thickness than the total depth of such mold. For example, if the mold had a bottom area of one square decimeter and 50 grams of fine ebonite powder of specific gravity 1.25 were used, and the mold were subjected to a pressure of 150 atmospheres, there would result, after vulcanization, a dense ebonite plate about four millimeters thick. This plate would be non-porous. Now, if the cover 5 is so held as to be more than four millimeters distant from the bottom of the mold 2, thus subjecting the material to less pressure, there will be produced a diaphragm having a certain degree of porosity, which porosity will depend upon the thickness of the diaphragm. The porosity is controlled by utilizing spacers 9 which fit over the bolts 4. By using spacers of different length or thickness, the degree of porosity can be exactly controlled. For example, by using spacers so as to produce in the mold and with the material above described plates having a final thickness of 5, 6, 7, 8, 10 and 12 millimeters thick instead of 4 millimeters, I am able to obtain porous plates or diaphragms in which the volume of the air capillaries equals 2, 33, 43, 50, 60 and 66% of the total volume of the plate or diaphragm. In this way it is possible to get porosities which run through the whole scale of the porosities of other forms of diaphragms, and still greater or smaller porosities, if desired. Still further variations in porosity can be obtained by treating the surface with a material such as barium sulphate in the manner above described.

In making a diaphragm in the illustrated mold, the cover is put in place after the proper spacers have been placed over the bolts 4, and the nuts 10 on the bolts are then tightened. The mold is then placed in a vulcanizer and the material is cured in the usual manner—preferably at a temperature corresponding to steam at three atmospheres pressure, although this may be varied to suit changing conditions.

Instead of using ebonite powder, ebonite shavings, turnings or particles of other form may be employed. The speed of percolation through a diaphragm or filter by a solution depends upon the radius of its capillaries. According to the law of Stokes and Neumann, the speed of discharge of a liquid through a capillary tube is directly proportional to the fourth power of its radius. The radius of the capillary tubes in a diaphragm of this character depends upon two factors; first, the ratio of the air volume of the capillary tubes to the total volume of the diaphragm; and second, the degree of subdivision of the ebonite used in making the diaphragms. Since the degree of subdivision of the particles may be readily controlled and since, as above described, it is possible to vary the porosity within wide limits, I am able to make diaphragms having capillaries whose radius varies over a wide range, thus getting diaphragms or filters adapted to give any desired speed of percolation.

While the chemical composition of the ebonite used for the diaphragms may vary within wide limits and may be selected in accordance with the use to which the product is to be put, I prefer to employ an ebonite mixture prepared and vulcanized as disclosed in my prior Patent 1,022,014, where the diaphragms or filters are intended to stand alkalies and acids. It is particularly important that the thin layer of unvulcanized ebonite on the surface of the particles should be of such composition, and that in the process of making the diaphragm this rubber be overvulcanized. Accelerators may be used so long as they do not have a detrimental influence on the chemical composition of the ebonite. The vulcanized ebonite forming the body of the particles employed need not have a long vulcanization since it subsequently undergoes a further vulcanization during the manufacture of the diaphragms.

By varying the degree of vulcanization of the particles, and of the diaphragm, the articles may be made pliable in varying degrees. It is possible to make them of a leather-like consistency and to any other degree of hardness desired.

If the diaphragms are desired to withstand the action of acids and alkalies, the ebonite particles may be covered with the thin layer of uncured ebonite in the following manner: A solution of 55% rubber and benzine with 10% graphite and 35% sulphur is prepared. The particles are mixed in this solution and then separated by filtration. The particles are dried in vacuum with recovery of the solvent and are pulverized. This operation may be repeated if necessary.

In carrying out this process, a few parts only of the uncured ebonite is mixed with about 100 parts of the ebonite particles. After the ebonite particles are mixed with the solution of rubber, benzine, graphite and sulphur, the solution is then removed by evaporation and the mass is heated and dried at about 80 to 100° C. until the whole of the solvent is evaporated and the top surface becomes dry so that the mass can be separated into powder by rubbing. The material is then powdered and if it is desired to coat the ebonite particles with a thicker layer of uncured ebonite than can be obtained from carrying out the process as above described, the operation may be repeated if necessary.

Instead of covering the ebonite particles with a coating of uncured ebonite, I may cover the ebonite particles with a layer of non-vulcanized rubber. In this case, it is desirable that the ebonite particles contain free sulphur so that the coating of non-vulcanized rubber will combine with the free sulphur during evaporation and heating. Whether the ebonite particles are covered with a layer of uncured ebonite or with a layer of raw rubber, the process of heating partially vulcanizes the coating on the ebonite particles with a layer of material which is more pliable than the ebonite particles. Since the layer of the semi-vulcanized ebonite or rubber, which coats the solid ebonite particles is very thin, it can neither run on heating nor fill up the interstices between the particles.

While I have illustrated and described the preferred embodiment of my invention, it will be understood that it is not thus limited, as it may be otherwise embodied or practiced within the scope of the following claims.

I claim:—

1. The process of manufacturing porous ebonite bodies which comprises bringing ebonite particles having a coating of uncured ebonite into such volume that they are in contact but have interstitial spaces, and vulcanizing the mass while maintaining its volume substantially constant.

2. The process of making porous ebonite bodies which comprises bringing particles of ebonite having a coating of uncured ebonite into a mold having a greater volume than the aggregate volume of such particles, and vulcanizing the same until an integral porous body is obtained while maintaining its volume substantially constant.

3. The process of making porous ebonite bodies which comprises bringing ebonite particles, whose surface portions at least are in an uncured condition, into such volume that they are in contact but have interstitial spaces, and vulcanizing the mass while maintaining its volume substantially constant.

4. A porous ebonite body comprising ebonite particles whose surface portions are initially uncured ebonite, the portions occupying such volume that adjacent particles are in contact but are not compacted into a non-porous solid mass, the coatings of the particles being permanently united by vulcanization between themselves and with the enclosed ebonite particles.

5. The process of manufacturing porous ebonite bodies which comprises bringing ebonite particles like powder, shavings and the like, coated with a raw rubber compound capable of being cured into ebonite, in such volume as will cause the adjacent particles to sufficiently contact and combine, but will not compact them into a solid non-porous mass, and then vulcanizing them into an integral body.

6. The process of making porous ebonite bodies such as diaphragms, filters and the like, which comprises introducing particles of ebonite having a coating of uncured ebonite into a mold, slightly compressing the mass to contact the particles but maintain interstitial spaces, and vulcanizing the mass while maintaining its volume substantially constant.

In witness whereof I have hereunto set my hand.

MEYER WILDERMAN.

CERTIFICATE OF CORRECTION.

Patent No. 1,791,437.  Granted February 3, 1931, to

MEYER WILDERMAN.

It is hereby certified that error appears in the printed specification of the above numbered patent requiring correction as follows: Page 3, line 77, claim 5, after the word "body" insert the words while maintaining its volume substantially constant; and that the said Letters Patent should be read with this correction therein that the same may conform to the record of the case in the Patent Office.

Signed and sealed this 10th day of March, A. D. 1931.

(Seal)

M. J. Moore,
Acting Commissioner of Patents.